(No Model.) 2 Sheets—Sheet 1.
R. S. ANGELL.
TRACTION ENGINE.
No. 282,944. Patented Aug. 14, 1883.
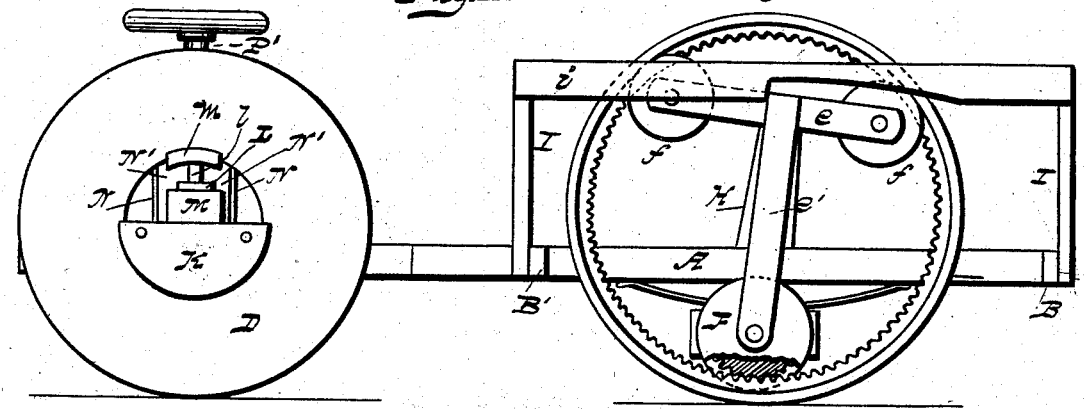
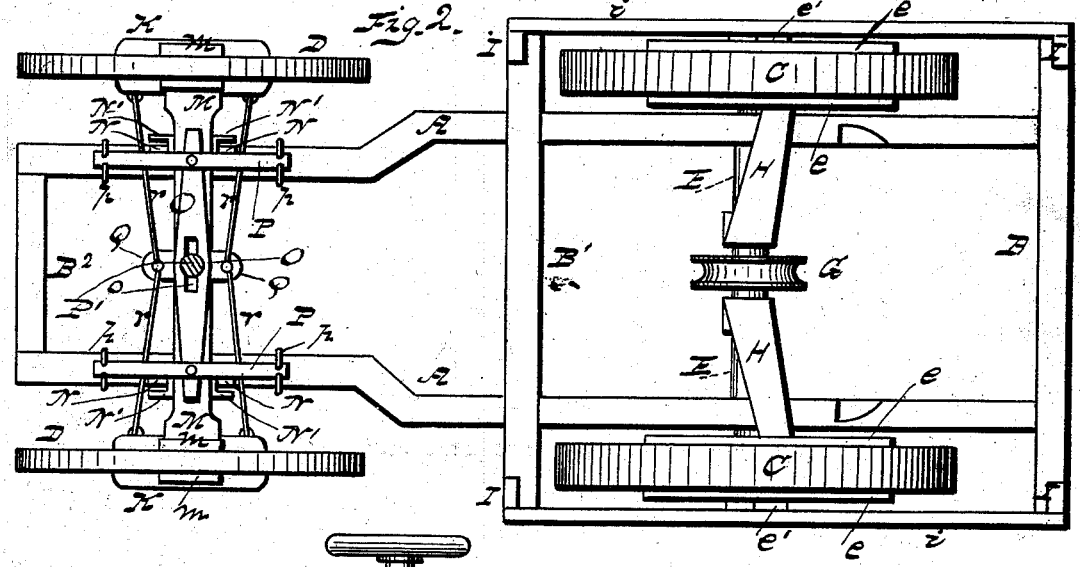
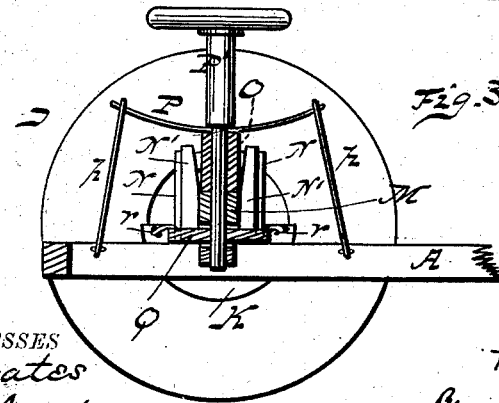
WITNESSES
E. H. Bates
INVENTOR
Ransom S. Angell
By Edw. J. Underwood
Attorney.

(No Model.)  2 Sheets—Sheet 2.
R. S. ANGELL.
TRACTION ENGINE.
No. 282,944.  Patented Aug. 14, 1883.
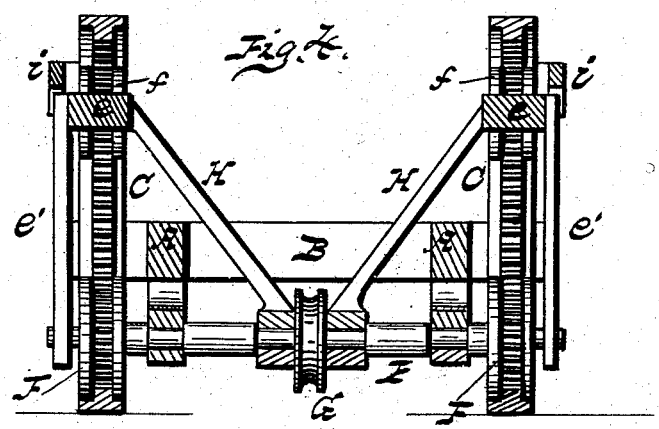
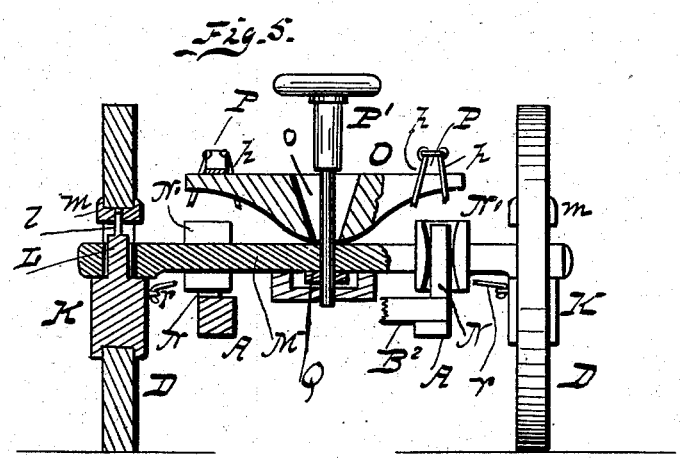
WITNESSES
E. H. Bates.
INVENTOR
Ransom S. Angell
By Edw. J. Underwood
ATTORNEY

UNITED STATES PATENT OFFICE.

RANSOM S. ANGELL, OF MOORHEAD, MINNESOTA.

TRACTION-ENGINE.

SPECIFICATION forming part of Letters Patent No. 282,944, dated August 14, 1883.

Application filed March 29, 1883. (No model.)

*To all whom it may concern:*

Be it known that I, RANSOM S. ANGELL, a citizen of the United States, residing at Moorhead, in the county of Clay and State of Minnesota, have invented certain new and useful Improvements in Traction-Engines, of which the following is a specification, reference being had therein to the accompanying drawings.

My invention, which I denominate the "self-adjusting circular track-laying engine," relates to improvements in the class of traction or road engines intended to draw loads on ordinary roads, or gangs of plows for prairie culture, or any analogous use, which produce or lay their own tracks. It also has relation to devices for communicating motion from the engine to the track or drive wheels by means to be hereinafter shown, and, further, to certain devices for steering or directing the machine, all which peculiarities of construction and operation will be hereinafter fully set forth and described in the specification and drawings.

The boiler and engine, constructed and provided with the customary cylinder, piston-rod, and other attachments, are mounted upon and securely attached to the body or bed of the carriage in any usual manner, so that the greater part of the weight will rest upon the rear or driving wheels, and motion is communicated to these wheels by a chain from the engine passing around a pulley or wheel on their axle.

Inasmuch as my invention relates more particularly to the construction and operation of the wheels and steering apparatus, it is not deemed necessary to show the boiler and engine in the drawings, but to confine myself to a description of the parts which I consider new. Therefore any suitable engine and boiler may be mounted on the bed of my carriage and used for propelling the same, and I make no claim to such, save in combination with my devices.

In the drawings, Figure 1 is a side elevation of my engine-carriage. Fig. 2 shows a plan view. Fig. 3 represents a detail view of the front wheel and the steering apparatus, shown partly in section. Fig. 4 is a cross-section of the drive-wheels and their axle, also exhibiting the braces. Fig. 5 is a view, one side being in section, of the front or guide wheels with their axle and the steering apparatus and its connections.

A A are the side bars, extending the whole length of the machine and forming the bed or body of the carriage, which hangs below the center of the wheels, and B B' B² are cross sills or bars, which, with the side bars, form the bed on which the engine and boiler are to be located.

C C are the drive-wheels, and D D the front or steering wheels, all of peculiar construction, as hereinafter shown. The rear or drive wheels, C, are made with circular rims, of metal, having neither hubs nor spokes, but having a continuous series of teeth extending all around their inner surface, at the center of the rim, to receive the cogs of the gear-wheel F, and flanges on each side of the teeth to receive the rims of the said gear-wheel F, which is rigidly connected with the axle or shaft E, near its end, and the smooth flanges also receive the friction-rollers *f* at the ends of the bar *e* of the frame. The wheels C are connected with the axle E in the following manner:

A T-shaped frame composed of two arms, *e* and *e'*, is provided, having the upright arm *e'* journaled on the axle E, which carries the gear-wheel F, and the upper bar, *e*, is made double, and carries between its sides, at each end, the friction-rollers *f*, which run in the flanges on the inner periphery of the drive-wheels C on each side of the teeth and support the ends of the bar *e*.

In the center of the axle E is a pulley-wheel, G, by which power from the engine is applied to revolve the axle and drive-wheels, and braces H H extend from each side of wheel G up to the inner bar, *e*, of the roller-frame. These braces have openings or boxes at their lower ends, through which the axle E passes, and they move on said axle.

At each end of the cross-bars B and B' of the frame are standards I, having rails *i* at the top of each pair, at the sides. These rails are cut into a shoulder on the under side to receive the ends of the bar *e'* as it reaches a vertical position, and prevent its moving forward.

It will be seen that the axle E is far below the center of the wheels C, and on level ground, or where no obstruction is encountered, the gear-wheels F will be at the lowest point on the inner rim of C, the bar $e'$ in a vertical position, with its top resting against the shoulder in $i$, and the bar $e$ of the frame horizontal, and as power is applied to the wheel G to revolve the axle E the same relative positions will be maintained, and the wheels F C will revolve, driving the carriage forward; but as soon as the drive-wheel C meets an obstruction the forward progress of C will cease, the frame $e\ e'$ will incline backward at top until the brace H reaches bar A, and the wheel F will begin to climb the rim of C until it reaches the height of the obstruction, when the brace H will rest upon the beam A, and the wheel C will be lifted upon the obstruction, recommence its revolution, and be carried over, and the frame $e\ e'$ and wheel F retake their normal position. The wheel C is at once a drive-wheel and an endless track on which the wheel F runs and ascends to lift wheel C over obstructions, and, as shown, when meeting an obstruction, the frame $e\ e'$ is inclined backward as wheel F climbs the track in C, the inclination of the frame being limited by the brace H striking against the side bar, A, of the bed, while its forward motion is limited by arm $e'$ striking against the shoulder in the rail $i$. The motion of each wheel C is independent of the other, and one can be raised over an obstruction while the other remains on the level. Their construction and action being similar, only one is described.

Next will be considered the steering apparatus. The wheels D are made solid, with a large circular opening in the center, and provided with a semicircular center piece or hub, K, fitting in this opening, and flanged or provided with overlapping edges to hold the wheel in place, and rising from this piece K is a bolt, L, which passes through a vertical opening in the end of the forward axle, M, and forms a connection with the same, allowing it to rise and fall. At the top of the bolt L is a pin, $l$, extending up to and into a chuck or rider, $m$, which holds the wheel steady at the top. The axle has a vertical movement upon the bolt L, which enables the front wheels to pass over obstructions. The rider $m$, like the semicircular hub K, has flanges fitting on each side of the wheel to hold it in place. Sufficient space is allowed between the semicircular hub K and the rider $m$ to permit the axle M to play up and down when the wheel crosses an inequality of the ground or other obstruction. The axle M has on each side, near the wheel, guides N, which are arranged to play between uprights N', rising from the frame A, which uprights hold the axle in position, but allow a vertical motion when the guide or front wheels D encounter an obstruction. A pivot-bolster, O, is mounted on the axle M. It is held in position by springs P, connected with the frame A by stirrups or stays $p\ p$. An elongated slot, $o$, in the bolster permits the passage of the turning post or stem P', which passes through the axle M, and is attached to and actuates the cross-head Q, which is connected with the hub-pieces K in the wheels D by the rods $r$, attached to eyebolts therein, and thus by turning the stem P' the guide or forward wheels are turned laterally to change the direction of the course of the engine. The slot $o$ in the bolster, being longer at top than at bottom, permits the ends of the bolster to move or play up and down when necessary, said motion being controlled and regulated by the springs P. It will thus be seen that when the engine is moving over level ground the forward axle rests on the semicircular hub-pieces, and direction can be changed by turning the stem P' to right or left, as desired; but when either of the forward wheels encounters an obstruction that end of the axle will rise from the frame, its guard-pieces N playing between the uprights N', and, if necessary, will lift the end of the bolster as well, and allow the wheel D to pass over the obstruction without changing the level of the bed of the carriage.

The bed of the carriage is made to hang low, so that the center of gravity will be below the center of the guide and drive wheels, and all danger of upsetting when passing over an obstruction is overcome.

The turning-post P' acts as the pivot on which the bolster and its attachments turn.

Having thus fully described my invention, what I claim therein as new and my discovery, and desire to secure by Letters Patent, is—

1. In a traction-engine constructed as described, the combination of the bed or carriage-frame A A B B' B², provided with the uprights I and rails $i$, the latter having shoulders to limit the forward motion of the frame $e\ e'$, and the backward motion of the said frame being limited by the braces H, which are arranged to strike against the frame A, with the axle E, having a pulley or wheel, G, by which motion is imparted, the gear-wheel F, frame $e\ e'$, carrying friction-rollers $f$, drive-wheels C, and braces H, all arranged and operating as hereinbefore described.

2. The combination of the carriage frame or bed A A B B' B² of a traction-engine, having uprights I and rails $i$, the latter provided with shoulders to receive the frame $e\ e'$, and thereby limit its forward motion or revolution, with the axle E, carrying the pulley or sprocket wheel G, the gear-wheels F, frame $e\ e'$, carrying the friction-rollers $f$, drive-wheels C, braces H, having boxes or bearings in which the axle E revolves, and arranged to strike against the frame A A, to limit the backward motion of the frame $e\ e'$ in the rim of the drive-wheels C, all substantially as described.

3. The guide-wheels consisting of the solid rim D, the semicircular hub K, the bolt L, the pin $l$, and the chuck or rider $m$, all as shown and described.

4. The combination of the solid wheel-rim

D, semicircular hub-piece K, bolt L, axle M, pin *l*, and chuck or rider *m*, all substantially as hereinbefore shown and described.

5. The combination of the wheels D, axle M, turning-post P', slotted bolster O, cross-head Q, and rods *r*, as shown, for the purpose of changing the direction of the traction-engine and passing the guide-wheels over obstructions without altering the level of the carriage-bed which supports the propelling mechanism, all substantially as described.

6. In a traction-engine, the combination of the carriage-bed A B, which supports the propelling mechanism, with the axles E M, the wheels C D, the bolster O, having springs and stays, as described, the turning-post P', the cross-head Q, rods *r*, and the semicircular hub-pieces K of the guide-wheels, all as shown, and for the purposes specified.

In testimony whereof I affix my signature in presence of two witnesses.

RANSOM S. ANGELL.

Witnesses:
F. D. LARRABEE,
GEO. N. LAMPHERE.